April 21, 1959  A. R. BLACKBURN ET AL  2,882,569
METHOD AND APPARATUS FOR MOLDING AND HARDENING ARTICLES
Filed March 29, 1957  2 Sheets-Sheet 1

INVENTORS
Andrew R. Blackburn
and Richard E. Steele
BY
ATTORNEYS

April 21, 1959  A. R. BLACKBURN ET AL  2,882,569
METHOD AND APPARATUS FOR MOLDING AND HARDENING ARTICLES
Filed March 29, 1957  2 Sheets-Sheet 2

INVENTORS
*Andrew R. Blackburn*
*and Richard E. Steele*

BY *Burns, Doane, Benedict & Irons*

ATTORNEYS

United States Patent Office 2,882,569
Patented Apr. 21, 1959

2,882,569

METHOD AND APPARATUS FOR MOLDING AND HARDENING ARTICLES

Andrew R. Blackburn, Westerville, and Richard E. Steele, Worthington, Ohio, assignors to Ram Incorporated, Columbus, Ohio, a corporation of Michigan Application March 29, 1957, Serial No. 649,492

15 Claims. (Cl. 22—193)

This invention relates to molding and, more particularly, to methods and apparatus for molding and rapidly hardening articles.

It is an established practice in the foundry industry to form cores, molds and other articles by shaping and compacting a mixture of granular material and a suitable binder and rapidly hardening such articles by pressure impregnation with a fluid precipitant which reacts with the binder to form a bonding agent. Such a process is disclosed, for example, in British Patent 654,817, dated June 27, 1951.

While the most common granular base material which has been used in the above process is ordinary foundry sand, other granular materials characterized by similar properties have been found acceptable. Some binders known to the art are sodium silicate, ethyl silicate, methyl silicate or their hydrolyzed compounds. Precipitants heretofore employed by the art include carbon dioxide, ammonia, hydrochloric acid, methyl alcohol, ethyl alcohol and acetone.

A widely accepted process, commonly called the "$CO_2$ process" involves molding and compacting a mixture of clean, substantially clay-free silica sand and sodium silicate binder and introducing carbon dioxide under pressure into the molded mass. The carbon dioxide immediately reacts with the sodium silicate to form a silica gel, thus rigidifying the molded article.

A number of methods are known to the prior art for introducing the carbon dioxide or other fluid precipitant into the shaped and compacted sand and binder mixture. None of these methods, however, have been completely satisfactory.

One prior art method is commonly referred to as the tube method wherein carbon dioxide or other precipitant is introduced into the compacted mixture through tubes inserted therein. The passage of gas through the tubes leads initially to rapid hardening in the region of the tube outlets and to further hardening as the gas flows outwardly through the sand to eventually escape into the atmosphere. An obvious disadvantage of the tube method is the damage to the molded articles caused by the insertion of the injection tubes. Among the other objections is that over-gassing occurs in the vicinity of the tube outlets and under-gassing occurs in critical areas of the molded article more remote from the tube outlets. Moreover, the carbon dioxide, in passing through the sand, tends to by-pass dense, less permeable pockets and seeks paths of least resistance or high permeability to the atmosphere. The result of this channeling effect is to over-gas the highly permeable areas and to under-gas the less permeable areas. Over-gassing is very detrimental because it makes the article friable. Under-gassing has no permanent detrimental effect if the molded article is thereafter exposed to the atmosphere for a prolonged period to permit complete hardening to be effected due to the reaction of carbon dioxide in the air with the remaining binder. Under-gassing, however, does partially defeat a primary advantage of the $CO_2$ process, viz., rapid hardening.

Another known technique involves the use of a non-permeable mold member containing spaced holes, perforations or passageways connecting the article shaping cavity of the mold with a source of carbon dioxide under pressure. This method also frequently results in over-gassing, both in the vicinity of the holes and in highly permeable areas due to channeling. In addition, imperfections corresponding to the configuration of the holes in the mold surface are formed in the surface of the molded article. Further, the molded article tends to become keyed to the holes and thus is difficult to remove from the mold cavity.

Still another method known to the prior art for introducing carbon dioxide into the sand and binder mixture involves removing the shaped articles from the mold and placing them, while still green, in a pressurized carbon dioxide atmosphere. A moderate green strength which may be imparted to the articles by certain silicate binders enables the articles, if carefully handled, to retain their shape after removal from the mold. While more even, over-all impregnation is obtained by this method than by those described hereinbefore, severe gas channeling is likely to result in zones of high permeability near the surface of the article. Because of the extra operation required to place the articles in a gas atmosphere and the large quantities of gas required, this method is relatively expensive.

To overcome the disadvantages of the prior art, it is a primary object of this invention to provide an improved method for introducing a fluid precipitant into articles molded from a mixture of a granular material with a silicate binder, thereby quickly hardening the mixture wherein substantially uniform impregnation is achieved throughout the article.

It is another object of this invention to provide an improved method for introducing a fluid precipitant into such articles which is efficient, economical and minimizes fluid channeling in the molded article.

It is an additional object of this invention to provide an improved method and apparatus for forming such articles and uniformly introducing a fluid precipitant through the surface of such articles without damage thereto.

It is a further object of this invention to provide an improved method and apparatus for forming such articles and uniformly introducing a fluid precipitant into a surface thereof through a fluid permeable mold which supports such surface in its entirety.

It is a still further object of this invention to provide an improved method and apparatus for forming such articles by introducing a hardening fluid precipitant into a surface thereof through a complementary fluid permeable mold surface which supports the article surface in its entirety and thereafter facilitating release of the shaped and hardened article from the mold by the introduction of additional fluid pressure through the permeable mold surface.

The term "fluid permeable material" as used herein refers to a porous material which permits the passage of fluid therethrough. A contoured molding surface of such material which is impressed upon the surface of a green, moldable mass provides continuous support for such mass. At the same time, fluid pressure may be introduced from the permeable mold outwardly through its contoured surface into the shaped mass. The term "fluid permeable mold" as used herein is intended to exclude a mold constructed of fluid impervious substance through which a plurality of relatively large holes extend to interrupt the continuity of the molding surface.

Generally described, the invention embraces a method of hardening articles such as cores and precision molds in the foundry industry, molded articles in the abrasives industry and the like, comprising bringing a fluid permeable body having a surface of predetermined shape and a mass of granular material mixed with a binder hardenable by a fluid precipitant into complementary surface engagement, and introducing the fluid precipitant outwardly through the fluid permeable surface of said body into the mass to harden rapidly the mass at least in the vicinity of the surface thereof.

The invention further embraces an apparatus for forming a foundry mold cavity between opposed masses of granular material mixed with a binder hardenable by a fluid precipitant comprising a fluid permeable body having molding surfaces protruding from opposite sides thereof, and means such as a conduit embedded in the fluid permeable body for introducing fluid under pressure outwardly through the protruding fluid permeable surfaces of the body. The fluid permeable body may be positioned between the masses in molding engagement therewith to shape the opposing portions of the molding cavity in the two masses. A fluid precipitant is then introduced through the protruding surfaces of the permeable body into the shaped faces of the masses. The fluid precipitant reacts with the binder to form a bonding agent, thereby quickly hardening the masses at least in the vicinity of said cavity.

The invention having been generally set forth, preferred specific embodiments for accomplishing one or more of the stated objects and others will now be described in detail with reference to the accompanying drawings in which.

Figure 1:
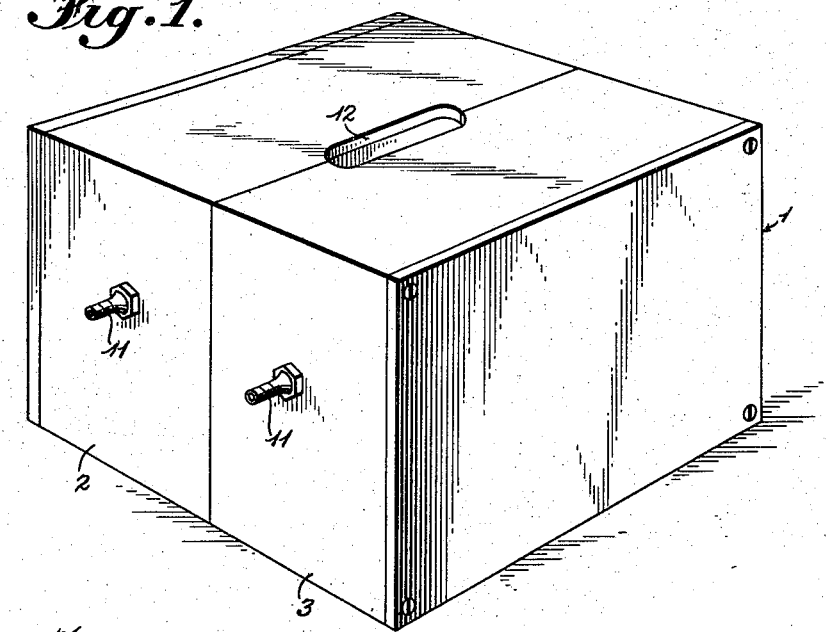
Figure 1 is a perspective view of a two-piece core box employed in connection with the invention.

With reference to the apparatus illustrated in Figure 1, the mold or core box designated generally by the reference numeral 1 consists of a pair of cooperable permeable mold segments 2 and 3. Each of the mold segments 2 and 3 is provided with a fluid impervious, preferably metal housing 4 which consists of thin metal plates secured together in box-like fashion by screws or any other suitable connection. The housing 4 is substantially filled with a permeable casting material 5, preferably a permeable plaster such as plaster of Paris. The faces 6 and 7 of the mold segments 2 and 3, respectively, are shaped to conform to the desired configuration of the foundry core or other article to be molded and define therebetween an article shaping cavity 8 when the mold is closed. One wall of the housing and permeable molding material 5 is slotted at 12 for the introduction into the cavity 8 of material to be molded. Pins 13 affixed to mold segments 2 matingly engage with sockets 14 in mold segment 3 to insure proper alignment of faces 6 and 7 during the molding operation.

Positioned within the permeable plaster mass in each of the die segments 2 and 3, respectively, are fluid conduits 9 and 10 which extend outside of the mold 1 for attachment by means of couplings 11 to a source of carbon dioxide or other fluid precipitant under pressure (not shown). The conduits 9 and 10 are each provided with a plurality of longitudinally spaced apertures. It is preferred that the conduits 9 and 10 be positioned in a serpentine pattern across the entire area of the ware forming surfaces 6 and 7 in spaced relationship with respect thereto to the end that an evenly dispersed blanket of fluid pressure may be forced from such conduits outwardly through the permeable material 5 and the ware forming surfaces 6 and 7.

In operation, the mold segments are joined so that the cavity 8 defined by faces 6 and 7 conforms to the shape of the article to be molded. A mixture of sand and sodium silicate is introduced into the cavity 8 through the slot 12 in the wall of the mold. It will be understood that any suitable base material and binder may be used in lieu of sand and sodium silicate. Some examples of granular material which may be used are silica sand, carborundum, zirconium silicate, zirconium oxide, aluminum oxide, ferrites (refractory metallic oxides), and an intimately mixed combination of refractory metallic oxides. The mold 1 is filled and compacted by means well known to the art. It is obvious that the slot 12 may be eliminated and a mass of the mixture placed on one of the mold segments while the mold is open. The mold can then be closed to compact the mixture and press it into conformity with the mold faces 6 and 7.

When the cavity 8 is filled and the mixture compacted to the desired degree, carbon dioxide under pressure is introduced into the conduits 9 and 10 and flows outwardly through the apertures therein, through the permeable material 5 and outwardly through the permeable faces 6 and 7 into the compacted and shaped, but as yet unhardened, mixture. The silica gel formed by the reaction of the carbon dioxide with the sodium silicate quickly rigidifies the article being molded. The mold segments 2 and 3 are then opened and the finished core removed. It will be understood that any fluid precipitant which reacts with the binder to form a rigid bonding agent may be employed in lieu of carbon dioxide.

The release of the shaped and hardened article from the mold may be facilitated by the introduction of air or other suitable fluid under pressure outwardly through the mold faces 6 and 7 to partially or completely break the bond between the article and such faces. A preferred releasing fluid is air under a pressure of between about 60 to about 125 pounds per square inch. The introduction of releasing fluid may be effected by disconnecting the carbon dioxide source from the conduits 9 and 10 and connecting thereto a source of releasing fluid by means of a suitable valve arrangement not shown. Preferably, the hardened article is initially released from only one of the mold faces by introduction of the releasing fluid through either of the mold faces 6 or 7 while the mold is still closed. Thus, when the mold segments 2 and 3 are opened, the article adheres to the mold surface through which no releasing fluid has been introduced. Subsequently, releasing fluid may be passed through the latter surface to facilitate complete removal of the finished article from the mold. Alternatively, the releasing fluid may be introduced through both mold faces 6 and 7 before the mold is opened.

It is apparent that, during the impregnation operation, the entire surface of the shaped mixture is uniformly supported. There are no large holes in the mold surface to damage the surface of the article being formed. Further, with this method, the permeable plaster 5 resists the natural tendency of the carbon dioxide to flow through the mold toward highly permeable areas near the surface of the shaped mixture. Instead, the gas flows substantially uniformly from the entire surface of the mold which minimizes the tendency for the gas to channel through and thus over-gas highly permeable areas of the mixture and under-gas areas of decreased permeability.

A variety of molded foundry sand articles or the like may be formed by the method of this invention. Frequently, such articles are very thick in certain areas and very thin in others. In such cases, it is desirable to introduce a relatively large amount of carbon dioxide into the thick areas and relatively small amounts into the thin areas. This variation in the distribution of the gas over the surface of the article being molded may be achieved by increasing the number of apertures in the conduits 9 and 10 adjacent the thicker areas of the mold cavity or by decreasing the spacing between adjacent conduit sections opposite the thicker areas of the mold cavity. Correspondingly, fewer apertures or more widely spaced conduit sections may be provided in the thinner areas of the mold cavity. By properly varying the distribution of fluid outlets, the flow density pattern over the surface of the mold cavity may be such that the amount of impregnation of an article positioned within the mold cavity is substantially uniform, despite wide variations in the thickness of the article. The flow density pattern may be similarly varied by spacing the conduits 9 at different distances from the mold faces 6 and 7. The amount of gas introduced at any particular location on the mold face will thus be inversely proportional to the distance between the mold face and the conduit at that location.

Figure 3:
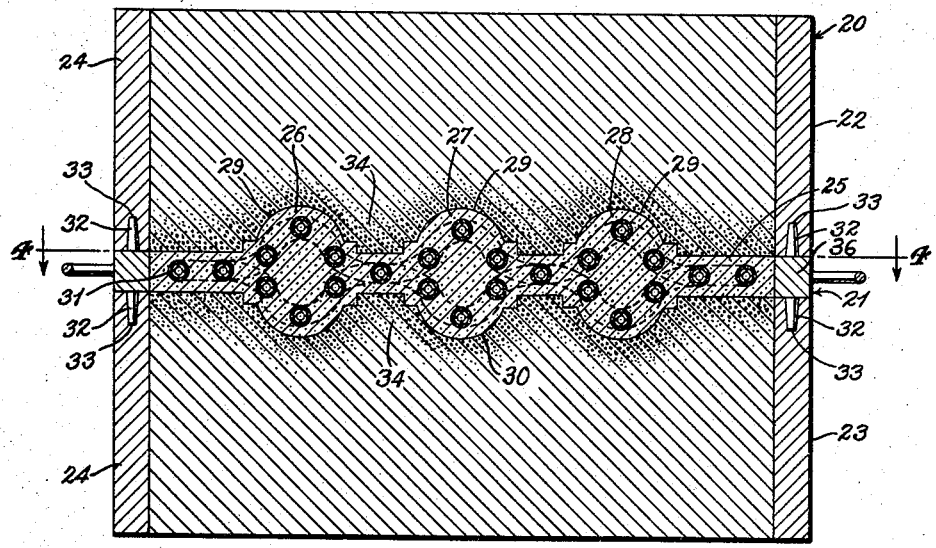
Figure 3 is a view in vertical section showing a permeable match plate.
Figure 4:
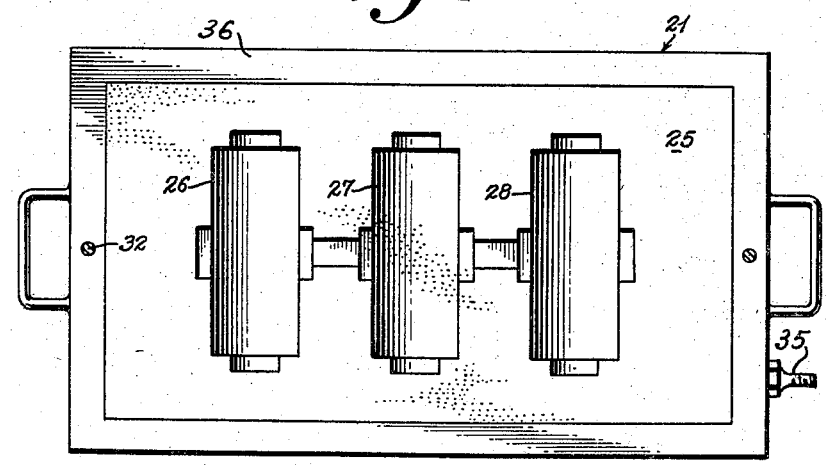
Figure 4 is a plan view of the match plate shown in Figure 3.

A modified apparatus is shown on Figures 3 and 4 of the drawings. In this embodiment, a permeable match plate 21 is shown positioned between the cope 22 or upper mold member and drag 23 or lower mold member of a sand foundry mold 20. The function of the match plate is to impart a predetermined configuration to the molding faces of the cope and drag of the sand mold 20.

The match plate 21 includes a supporting frame 36 preferably constructed of metal which confines a permeable body 25 made of a permeable plaster such as plaster of Paris or any other suitable permeable casting material. Formed on the article shaping faces 29 and 30 of the permeable body 25 are a plurality of molding patterns 26, 27 and 28. Embedded within the permeable member 25 is a fluid pressure conduit 31 having a plurality of apertures spaced longitudinally therein. The conduit 31 is spaced from each of the article shaping faces 29 of the mold member 25 and laid in a serpentine pattern thereacross. The conduit 31 which extends outside of the match plate 21 may be attached by means of a coupling 35 to a source of carbon dioxide (not shown) or other fluid precipitant under pressure to the end that an evenly dispersed blanket of fluid pressure may be forced from the apertures in conduit 31 outwardly through the permeable body 25 and the article shaping faces 29.

The match plate 21 has affixed thereto a plurality of pins 32 which are matingly engageable with sockets 33 in the frame 24 of cope 22 and drag 23, respectively. A mass 34 of foundry sand or other suitable granular material mixed with sodium silicate or other suitable binder is positioned within the cope 22 and drag 23 for pressure molding engagement with the article shaping faces 29 of the match plate 21 when the mold is closed. The faces 29 of the match plate 21 define the configuration of the molding cavity to be imparted to the face of the sand-binder mixture in each of the cope and drag members 22 and 23.

In operation, the cope 22 and drag 23 containing the mixture of sand and binder are positioned on opposite sides of the match plate 21 and closed to compressively engage in molding relationship the article shaping faces 29 of the match plate 21 and the molding faces of the mixture. Carbon dioxide is then introduced through the conduit 31, the apertures therein, the permeable body 25 and outwardly through the article shaping faces 29 into the sand-binder mixture to harden such mixture in the vicinity of the molding faces of the cope and drag 22 and 23 which are then opened to separate them from the match plate.

Figure 2:
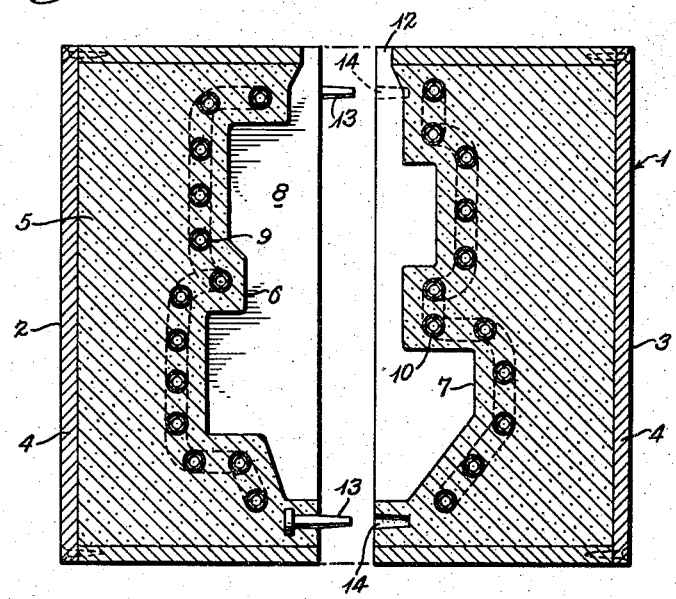
Figure 2 is a view in vertical section of the core box shown in Figure 1 with the segments separated to show the permeable die members.

It is apparent that the hereinbefore-discussed advantages accruing to the method and apparatus for molding cores described in connection with Figures 1 and 2 also characterize the method and apparatus for forming sand molds described in connection with Figures 3 and 4. It is obvious that the flow pattern of the carbon dioxide may be varied across the surface of the match plate 21 in the same manner as previously described with respect to the core box 1. It is also apparent that release of the shaped and hardened mixture from the match plate 21 may be facilitated by the introduction through conduit 31 and outwardly through the permeable match plate surfaces of air or any other suitable releasing fluid under pressure in the same manner described with respect to the core box 1.

It will be apparent that a fluid permeable match plate generally similar to that shown in Figure 3 having a fluid permeable surface on at least one side could be used for the introduction of a fluid precipitant through the surface of a green, mixed mass of granular material and hardenable binder which has been previously shaped to a configuration complementary to that of the match plate surface.

While this invention has been described in detail with respect to specific preferred embodiments, it will be understood that the invention is not limited to the details shown and described but is determined by the scope of the appended claims.

We claim:

1. A method of hardening articles comprising bringing into complementary surface engagement a mass of granular material mixed with a binder hardenable by a fluid precipitant and a shaped porous surface of a fluid permeable body having pores sufficiently minute to prevent imprinting of the configuration of the pores on the face of the granular material and keying of the granular material into the pores, and introducing a blanket of the fluid precipitant outwardly through the pores in the fluid permeable surface of said body into the entire area of the face of the mass in engagement with the porous surface to harden rapidly said mass at least in the vicinity of the surface thereof.

2. A method as recited in claim 1 wherein said granular material comprises a finely divided abrasive.

3. A method as recited in claim 1 wherein said granular material comprises silica sand.

4. A method as recited in claim 1 wherein said granular material comprises aluminum oxide.

5. A method as recited in claim 1 wherein said granular material comprises a refractory metallic oxide.

6. A method as recited in claim 1 wherein said binder comprises sodium silicate and said fluid precipitant is carbon dioxide.

7. A method of molding and hardening articles comprising bringing into molding engagement a mass of granular material mixed with a binder hardenable by a fluid precipitant and a porous article engaging surface of a fluid permeable mold having pores sufficiently minute to prevent imprinting of the configuration of the pores on the face of the granular material and keying of the granular material into the pores to shape a surface of said mass, and introducing a blanket of the fluid precipitant under pressure outwardly through the pores in the fluid permeable surface of the mold into the entire area of the face of the mass in engagement with the porous surface to harden rapidly said mass at least in the vicinity of the surface thereof.

8. A method as recited in claim 7 wherein said granular material comprises silica sand.

9. A method as recited in claim 7 wherein said binder comprises sodium silicate and said fluid precipitant is carbon dioxide.

10. A method of molding and hardening articles comprising bringing into molding engagement a mass of granular material mixed with a binder hardenable by a fluid precipitant and a porous article engaging surface of a fluid permeable mold having pores sufficiently minute to prevent imprinting of the configuration of the pores on the face of the granular material and keying of the granular material into the pores to shape a surface of said mass, introducing a blanket of the fluid precipitant under pressure outwardly through the pores in the fluid permeable surface of the mold into the entire area of the face of the mass in engagement with the porous surface to harden rapidly said mass at least in the vicinity of the surface thereof, and introducing additional fluid under pressure outwardly through the fluid permeable surface of the mold to facilitate release therefrom of the shaped and hardened article.

11. A method of molding and hardening articles comprising positioning a mass of granular material mixed with a binder hardenable by a fluid precipitant in an article shaping cavity defined by opposed contoured porous surfaces of a pair of cooperable, fluid permeable dies having pores sufficiently minute to prevent imprinting of the configuration of the pores on the face of the granular material and keying of the granular material into the pores to shape said mass, and introducing a blanket of the fluid precipitant outwardly through the pores in substantially the entire area of at least one of the fluid permeable contoured die surfaces to harden the shaped mass.

12. A method as recited in claim 11 wherein said binder comprises sodium silicate and said fluid precipitant is carbon dioxide.

13. A method of molding and hardening articles comprising positioning a mass of granular material mixed with a binder hardenable by a fluid precipitant in an article shaping cavity defined by opposed contoured porous surfaces of a pair of cooperable, fluid permeable dies having pores sufficiently minute to prevent imprinting of the configuration of the pores on the face of the granular material and keying of the granular material into the pores to shape said mass, introducing a blanket of the fluid precipitant outwardly through the pores in substantially the entire area of at least one of the fluid permeable contoured die surfaces to harden the shaped mass, and introducing additional fluid under pressure outwardly through at least one of the fluid permeable die surfaces to facilitate release therefrom of the shaped and hardened article.

14. A method of molding and hardening opposed faces of a pair of masses of granular material mixed with a binder hardenable by a fluid precipitant comprising positioning between said masses in molding engagement therewith a fluid permeable porous body having opposed protruding molding surfaces having pores sufficiently minute to prevent imprinting of the configuration of the pores on the face of the granular material and keying of the granular material into the pores to shape the faces of said masses, and introducing a blanket of the fluid precipitant under pressure outwardly through the pores in both of the fluid permeable surfaces of said body to harden rapidly the shaped masses at least in the vicinity of the surfaces thereof.

15. A method as recited in claim 14 wherein said binder comprises sodium silicate and said fluid precipitant comprises carbon dioxide.

References Cited in the file of this patent

UNITED STATES PATENTS

| 2,619,702 | Blackburn et al. | Dec. 2, 1952 |
| 2,682,692 | Kohl | July 6, 1954 |

FOREIGN PATENTS

| 654,817 | Great Britain | June 27, 1951 |

OTHER REFERENCES

Transactions of the American Foundrymen's Society, vol. 63, pp. 488–492 (1955).
Foundry, pp. 106–109, March 1956.
Foundry, pp. 128–135, March 1956.